Patented Oct. 26, 1954

2,692,880

UNITED STATES PATENT OFFICE 2,692,880

PRODUCTION OF CYANURIC CHLORIDE

Anthony J. Cofrancesco, Guilderland, N. Y., assignor to General Aniline & Film Corporation, New York, N. Y., a corporation of Delaware No Drawing. Application November 14, 1951, Serial No. 256,372

2 Claims. (Cl. 260—248)

This invention relates to a method of producing cyanuric chloride by polymerizing cyanogen chloride.

Cyanuric chloride has been found to be a valuable intermediate in the manufacture of many products, as for example, chemotherapeutic agents, insecticides, dyes, brightening agents, synthetic resins, plastics, rubber, explosives and other materials. For many of these uses, particularly in the manufacture of brightening agents, it is highly desirable that the cyanuric chloride employed be of a relatively high degree of purity. However, the most important method of producing cyanuric chloride is by polymerization of cyanogen chloride, and the cyanuric chloride thus produced is known to contain a great many impurities generally believed to be linear polymers of cyanogen chloride. Such impurities must be removed by expensive and time-consuming procedures whenever a pure cyanuric chloride is needed as an intermediate or for other purposes. Further, the yields obtained in such previously employed polymerization methods have not been entirely satisfactory.

An object of this invention is to provide a method of polymerizing cyanogen chloride to produce a substantially pure cyanuric chloride in a substantially high yield. Other objects and advantages will appear as the description proceeds.

These objects are attained by the instant invention, which includes polymerization of cyanogen chloride in an inert organic solvent therefor in the presence of a catalyst comprising a mixture of hydrogen chloride and aluminum chloride, optionally in the presence of a solid absorbent. After separation of the impurities, and absorbent if used, the resulting solution of pure cyanuric chloride may be employed as such or the pure cyanuric chloride may be isolated therefrom by evaporation to dryness, concentration over a hot bath followed by cooling, or other known isolation procedure.

The purity of the product obtained in accordance with the instant invention is high and requires no additional purification step, possibly as a result of a more thorough polymerization of the above-mentioned linear polymer impurities of cyanogen chloride to the point at which they form readily separated tars. Likewise, the yield of the process of this invention is unexpectedly high, being substantially higher than that of a similar process using either hydrogen chloride or aluminum chloride alone.

Any inert organic solvent for the cyanuric chloride may be employed, such as chlorinated hydrocarbons, e. g., carbon tetrachloride, chloroform, ethylene dichloride, trichlorethylene, chlorobenzene, and the like; aliphatic ethers, such as ethyl ether, isopropyl ether, n-butyl ether, dioxane, butyl Cellosolve (ethylene glycol monobutyl ether), diethyl Cellosolve (ethylene glycol diethyl ether), and the like; hydrocarbons, such as benzene, heptane, and the like; certain ketones, nitriles, and nitrated aromatic compounds; and other inert organic solvents for the cyanuric chloride.

During the treatment in accordance with the present invention, the impurities separate out as tars, resins, and the like, apparently as a result of the further polymerization of the aforementioned linear polymer impurities. To assist in the separation, a commercial absorbent may be added in order to absorb the tars and resins formed. Such suitable absorbents may be Hyflo, Filter-Cel (a commercial absorbent silica), charcoal, Fuller's earth, absorbent clays, and other well-known absorbents and/or filter aids.

The process is preferably carried out under superatmospheric pressure and at a temperature of from about 20–40° C. in order to obtain the desired high rate of reaction. Pressure is employed in order to maintain the HCl in solution and to avoid undue loss of cyanogen chloride which boils at about 13.8° C. at atmospheric pressure. While higher pressures may be found desirable in some instances, pressures of about 15 to 30 p. s. i. are preferred, having regard to economy of operation and equipment, safety factors and the like. Similarly, at temperatures above about 50° C., the reaction speed increases to the point where it is not readily controlled and may result in an explosion. Being exothermic, the reaction must be controlled by cooling. The desired pressure is produced by injection of the requisite amount of HCl gas under pressure. It will be understood that lower temperatures and pressures may be employed, with corresponding lower rates of reaction.

In carrying out the process anhydrous hydrogen chloride is preferably added to a solution of cyanogen chloride in the presence of aluminum chloride and an absorbent and the proper temperature and pressure maintained until the reaction is completed. However, the order of addition may be changed, whereby cyanogen chloride may be added to a reaction mass comprising a solvent for the cyanogen chloride, hydrogen chloride, aluminum chloride and an absorbent.

The aluminum chloride is preferably employed in a range of about 5 to 10% by weight of the cyanogen chloride.

Proportions of aluminum chloride substantially below this range do not produce the desired results, while proportions substantially above this range, while harmless, do not improve the results and are economically undesirable. The amount of HCl employed is determined by the operating pressure and temperature, sufficient HCl being added to produce the desired pressure at the temperature of operation. Thus, the preferred amount of HCl is that sufficient to produce a pressure of about 15 to 30 p. s. i. at temperatures of about 20 to 40° C.

The following example of the invention, in which parts are by weight unless otherwise indicated, is to be regarded as illustrative and not limitative:

Example

To 1300 parts of an 8.9% solution of cyanogen chloride in carbon tetrachloride in an autoclave are added 10 parts anhydrous $AlCl_3$ and 10 parts Hyflo (a diatomaceous earth). At 20° C. sufficient anhydrous HCl is bubbled in so that the pressure rises to about 20 lbs. per square inch. The reaction mass is agitated for about ½ hour during which time the pressure rises to about 25 p. s. i., the temperature being maintained at between 35–40° C. Agitation is continued for 12 hours, during which time the pressure and temperature decrease. After venting the pressure, the charge is filtered. The water white filtrate is concentrated over a hot bath to about 80% of its volume and allowed to cool. The white crystalline cyanuric chloride is filtered and dried.

The melting point of the product is 145–146° C. The purity, by sublimation tests, is 99%. The yield of pure product is about 80% of theory.

On condensation with 4,4'-diaminostilbene-2,2'-disulfonic acid, a product is obtained which is much superior as a brightening agent and the like to that obtained from the conventionally prepared cyanuric chloride.

Various modifications and variations of this invention will be obvious to a person skilled in the art, and such variations and modifications are to be regarded as within the purview of this application and the spirit and scope of the appended claims.

I claim:

1. A method of producing cyanuric chloride comprising the step of polymerizing, at a temperature of about 20° to 40° C., cyanogen chloride dissolved in carbon tetrachloride in the presence of a solid absorbent selected from the group consisting of diatomaceous earth, charcoal, absorbent silicas and absorbent clays and a catalyst comprising a mixture of aluminum chloride and sufficient hydrogen chloride to maintain a pressure of about 20 to 25 p. s. i.

2. The process of claim 1 wherein the solid absorbent is diatomaceous earth.

References Cited in the file of this patent

UNITED STATES PATENTS

| Number | Name | Date |
|---|---|---|
| 2,414,655 | Metcalfe | Jan. 21, 1947 |
| 2,416,656 | Thurston | Feb. 25, 1947 |
| 2,417,659 | Oldham | Nov. 18, 1947 |
| 2,491,459 | Thurston | Dec. 13, 1949 |
| 2,541,053 | Hartigan | Feb. 13, 1951 |

OTHER REFERENCES

In re Migrdichian 544 O. G. 458 and 459 (129 F(2d) 547), June 15, 1942.